Patented Jan. 5, 1932

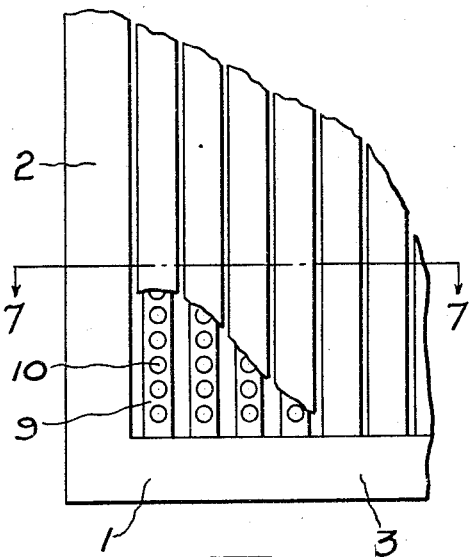
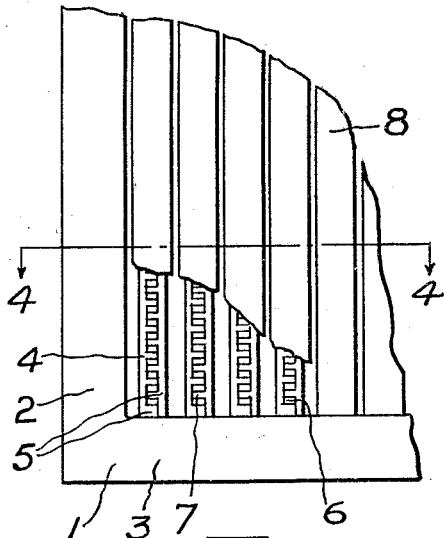
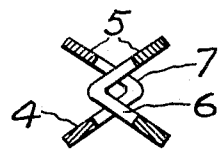
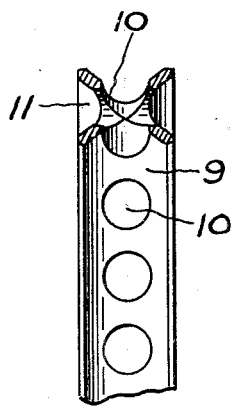
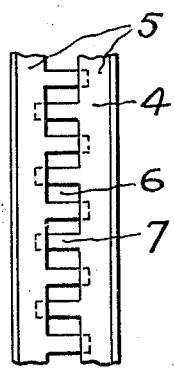

1,839,989

UNITED STATES PATENT OFFICE

HERBERT NEALE, OF VANCOUVER, BRITISH COLUMBIA, CANADA

STORAGE BATTERY PLATE

Application filed July 20, 1929. Serial No. 379,746.

My invention relates to improvements in storage battery plates the object of which is to so construct the grid that the paste surface exposed to direct acid contact is inordinately great; to provide a structure in which the paste is thoroughly bonded to the grid and also to leave no grid surface, other than its surround, exposed to the acid.

The invention consists essentially of a grid frame supporting a plurality of lead posts, each of which are separately coated with paste, so that free passage of acid between the posts is provided, as will be more fully described in the following specification and shown in the accompanying drawings, in which:—

Fig. 1 is an elevational view of a portion of a battery plate with a portion of some of the posts exposed.

Fig. 2 is a cross sectional view of one of the posts.

Fig. 3 is an elevational view of one of the posts.

Fig. 4 is a cross sectional view of the plate taken on the line 4—4 of Figure 1.

Fig. 5 is an elevational view of a portion of a battery plate made with a modified form of post.

Fig. 6 is a general view of the modified post.

Fig. 7 is a cross sectional view of the plate taken on the line 7—7 of Figure 5.

In the drawings like characters of reference indicate corresponding parts in each figure.

The numeral 1 indicates generally a portion of the grid frame of a battery plate, consisting of vertical members 2 and horizontal members 3.

Extending between the horizontal members 3 are lead posts generally indicated by the numeral 4, which are formed with two strips of lead 5, see Figure 2, having regularly spaced rectangular apertures 6 throughout their entire length which are separated from each other by horizontal spacer bars 7. The strips 5 are bent along their vertical axes to form an angle section and two of them are placed together with the apices of the spacer bars 7 of one strip passing through the apertures 6 of the adjacent strip. The plate 1 is placed in a mould with division strips between each of the posts and between the vertical members 2 and their adjacent post and paste is filled into the mould to entirely cover each post and to form a column 8, the sides of which are all bonded together by paste passing between the spacer bars 7 of the strips 5 in both horizontal and vertical directions.

In the modification shown in Figures 5, 6 and 7 the post 9 consists of a bar X shape which is provided with regularly spaced apertures 10 and 11 extending through its internal angles, such apertures intersecting each other, so that when each post is entirely covered with paste as shown in Figure 7, the paste on each face of the post will be bonded through the apertures 10 and 11 to the paste on each other side.

It will thus be seen that I have invented a battery plate wherein the pasted elements are separated from each other in order that their active surfaces are materially increased and that the acid in the assembled battery is free to pass between each plate and also between the associated parts thereof.

What I claim as my invention is:

1. In a storage battery plate, a plurality of posts, each formed of two strips of metal substantially V-shaped in cross section and provided with a longitudinal row of equidistantly spaced apertures, the apex of each strip being received by the apertures of the other strip, whereby the apices of the respective strips are interfitted, and active material completely covering said strips.

2. In a storage battery plate, a plurality of posts, each formed of two strips of metal substantially V-shaped in cross section and provided with a longitudinal row of spaced apertures, the apex of one strip being received by the apertures of the other strip, whereby the apices of said strips are interfitted to define an opening along the longitudinal axis of the post, and active material surrounding said strip and received by said opening.

Dated at Vancouver, B. C., this 29th day of June, 1929.

HERBERT NEALE.